United States Patent [19]

Skarstad et al.

[11] Patent Number: 4,619,874
[45] Date of Patent: Oct. 28, 1986

[54] ELECTROCHEMICAL CELLS WITH END-OF-LIFE INDICATOR

[75] Inventors: Paul M. Skarstad, Plymouth; Thomas G. Hayes, Minneapolis, both of Minn.

[73] Assignee: Medtronic, Inc., Minneapolis, Minn.

[21] Appl. No.: 641,684

[22] Filed: Aug. 17, 1984

Related U.S. Application Data

[63] Continuation of Ser. No. 375,447, May 6, 1982, abandoned.

[51] Int. Cl.$^4$ ............................................. H01M 10/48
[52] U.S. Cl. ....................................... 429/91; 429/196; 429/199; 429/105
[58] Field of Search .................... 429/91, 90, 196, 199, 429/105; 320/48

[56] References Cited

U.S. PATENT DOCUMENTS

| | | | |
|---|---|---|---|
| 3,926,669 | 12/1975 | Auborn | 136/6 LN |
| 4,139,680 | 2/1979 | Schlaikjer | 429/196 X |
| 4,167,608 | 9/1979 | Isiattino | 429/196 |
| 4,201,839 | 5/1980 | Johnson et al. | 429/194 |
| 4,246,327 | 1/1981 | Skarstad et al. | 429/196 X |
| 4,247,607 | 1/1981 | O'Boyle | 429/218 X |
| 4,259,415 | 3/1981 | Tamura et al. | 429/90 |
| 4,260,668 | 4/1981 | Lecerf | 429/194 |
| 4,264,687 | 4/1981 | Dey et al. | 429/196 X |
| 4,279,973 | 7/1981 | Venkatasetty | 429/196 X |
| 4,328,289 | 5/1982 | Zupancic | 429/196 X |

FOREIGN PATENT DOCUMENTS 2837511  3/1979  Fed. Rep. of Germany .

*Primary Examiner*—Charles F. LeFevour
*Attorney, Agent, or Firm*—Vidas & Arrett

[57] ABSTRACT

Electrochemical cells having an oxidizable active anode material, a solid, non-reactive electronically conductive cathode current collector, and an electrolytic solution between and in contact with the anode and the cathode current collector, the electrolytic solution comprising a solvent cathode component which is a liquid oxyhalide or thiohalide. And anode ion transporting solute component dissolved therein for rendering the electrolytic solution conductive of anode metal ions, the electrolytic solution having an end-of-life (EOL) component associated therewith, the EOL component being selected from the group consisting of the Main Group V halides preferably arsenic tribromide ($AsBr_3$), arsenic trichloride ($AsCl_3$), arsenic trifluoride ($AsF_3$), vanadium halides, transition metal sulfides, oxides, except for the actinide series and technetium, and mixtures thereof to provide end-of-life indication. The EOL component selected in any specific instance has an electropotential which is lower than that of the specific solvent cathode component used i.e., the primary cathode material in the electrolytic solution.

20 Claims, No Drawings

ELECTROCHEMICAL CELLS WITH END-OF-LIFE INDICATOR

This is a continuation of application Ser. No. 375,447, filed May 6, 1982 now abandoned.

DESCRIPTION

1. Background of the Invention

This invention relates generally to electrochemical cells and batteries, hereinafter referred to collectively as "electrochemical cells" or simply "cells". Most particularly, the invention relates to electrochemical cells having an oxidizable active anode material, a solid non-reactive, electronically conductive cathode current collector, a liquid oxyhalide or thiohalide cathode electrolytic solution including an anode ion transporting component solute and having an end-of-life (EOL) component associated with the solution. To be useful in critical applications such as medical uses involving implantation, for example, some warning of end-of-life is highly desirable in such cells. The association of an amount of such an EOL component with the electrolytic solution in accordance with this invention provides end-of-life indication in the form of a change in the discharge voltage of the cell.

For example, the most preferred form of the invention comprises a thionyl chloride cathode/electrolyte cell having a lithium anode and a porous carbon cathode collector. Such cells provide a flat discharge voltage until the cell is spent. When it is spent, the voltage drops suddenly. The association of an EOL indicator component to such a cell, in accordance with this invention, provides a voltage change as the cell discharges thus giving warning of end-of-life.

An additional feature and advantage of the invention lies in the unexpected discovery that, even though the EOL component may not be fully utilized as the cell discharges, the electrolytic solution, particularly when thionyl chloride is utilized, as the cathode component has been found to deliver increased capacity as compared to similar cells without the EOL component.

2. Summary of the Invention

This invention is specifically directed to the association of an end-of-life (EOL) indicator component, selected from the group consisting of the main Group V halides preferably arsenic tribromide ($AsBr_3$), arsenic trichloride ($AsCl_3$), arsenic trifluoride ($AsF_3$), vandium halides transition metal sulfides and oxides except for those of the actinide series and technetium, and mixtures thereof, with the electrolytic solution of electrochemical cells having an oxidizable active anode material, a solid non-reactive, electronically conductive cathode current collector and wherein the electrolytic solution, between and in contact with the anode and the cathode current collector, comprises a liquid inorganic oxyhalide or thiohalide solvent and a solute dissolved therein for rendering the solution conductive of the anode metal ions. The EOL component may be associated with the eletrolyte solution as a solute therein or as a separate solid physical component exposed to the solution and in physical contact with the cathode current collector.

DETAILED DESCRIPTION OF THE INVENTION

The cathode comprises a solid, non-reactive, electronically conductive, inert current collector upon the surface of which the electrolyte solvent and cathode component is electrochemically reduced, the solvent cathode component in conjunction with the oxidizable anode thereby serving as the primary source of electrical energy during discharge of the cell. The cathode component is considered to be the primary active cathode material, the EOL component is a secondary cathode material.

Acceptable cathode collector materials include high surface area carbon and certain metallic sponges and felts such as nickel, stainless steel, Hastelloy, Monel and combinations thereof. Other materials will be apparent to those familiar with this art.

It is believed that the liquid oxyhalide or thiohalide solvent cathode is electrochemically reduced on the surface of the cathode current collector to yield a halogen ion which reacts with a metallic ion from the anode to form an insoluble metal halide such as, for example, lithium chloride. The overall effect is to electrochemically reduce the solvent by removal of a portion of its halogen content in conjunction with the oxidation of the anode metal thereby obtaining electrical energy from the cell.

Since the reaction occurs at the surface area of the cathode collector, it is most preferred that the cathode collector be of high surface area. The most preferred high surface area cathode is porous carbon such as carbon black which has been pressed lightly to form a porous pellet. Typically, a preferred high surface area cathode will possess a surface area of $10^6$ times the geometric surface area, for example. This, of course, may vary considerably.

The anode is an oxidizable material and is preferably lithium metal. Other oxidizable anode materials may be used in the cells of this invention and include the other alkali metals such as sodium, potassium, etc. and the alkaline earth metals such as calcium and magnesium, etc. The anode material selected must provide a potential versus the electrolytic solution i.e., the anode must be more electropositive than the cathode component of the electrolytic solution utilized and the anode must be oxidized thereby.

The anode may be constructed of the oxidizable material in contact with a metal substrate such as a screen or grid, for example. The substrate for a lithium anode, for example, may be made of nickel, nickel alloys such as monel, or stainless steel. The preferred anodes are formed by pressing lithium foil onto nickel or stainless steel substrate which acts as a current collector.

As already indicated, the electrolytic solution comprises a solvent cathode component which is a stable, liquid, inorganic oxyhalide or thiohalide solvent as the primary active cathode material, a solute dissolved therein for rendering the solution conductive of the anode metal ions and an EOL component according to the invention. The EOL component functions as a secondary cathode in that it discharges after the discharge of the liquid oxyhalide or thiohalide to provide the end-of-life signal in the form of a change in discharge potential.

Applicable oxyhalide and thiohalide solvent materials include phosphoryl chloride ($POCl_3$), monofluophosphoryl dichloride ($OPFCl_2$), monobromophosphoryl dichloride ($OPBrCl_2$), phosphoryl bromide ($POBr_3$), thiophosphoryl chloride ($PSCl_3$), thiophosphoryl bromide ($PSBr_3$), thionylchloride ($SOCl_2$), thionyl bromide ($SOBr_2$), sulfuryl chloride ($SO_2Cl_2$), selenium oxychloride ($SeOCl_2$), chromyl chloride ($CrOCl_2$), Vanadyl chloride ($VOCl_3$) and compatible mixtures thereof. Such inorganic solvents are referred to herein collectively as liquid oxyhalides and thiohalides. The most preferred solvent is thionyl chloride.

It is preferred that the solvent be dried prior to use. In the most cases, the solvent is readily dried by fractionally distilling it from lithium.

The electrolytic solution must be capable of transporting ions of the anode metal. In general, this is accomplished by dissolving a soluble salt of the anode metal in the solvent. Other compounds may initially be dissolved instead of or in addition to an anode metal salt; however, on discharge the solution must sustain a flux of cations from the anode to the cathode current collector. Typical anode metal salts which are soluble are those with complex anions, such as, $AlCl_4^-$, $Al_4^-$, $PF_6^-$, $AsF_6^-$, $SbCl_6^-$, $B_{10}Cl_{10}^{--}$, $B_{12}Cl_{12}^{--}$, $ClSO_3^-$, $ClO_4^-$.

The solute for a particular cell may be chosen to yield a combination of any of the anions and cations listed above; however, the electrolyte must contain at least $10^{-3}$ moles per liter of cation and at least $10^{-3}$ moles per liter of anion. Preferably, at least $10^{-1}$ moles per liter of cation and at least $10^{-1}$ moles per liter of anion are present. It is also preferred that a dried solute be used or that the electrolytic solution be dried after it has been prepared. Refluxing over lithium is satisfactory for drying.

In the case of cells using a lithium anode it is most preferred that the electrolytic solution contain a lithium solute compound. The most preferred lithium solute compound is lithium tetrachloroaluminate ($LiAlCl_4$). Others include lithium tetrachloroborate ($LiBCl_4$), lithium tetrafluoroborate ($LiBF_4$), lithium hexafluorophosphate ($LiPF_6$), lithium hexafluoroarsenate ($LiAsF_6$), lithium hexafluoroantimonate ($LiSbF_6$), lithium hexachloroantimonate ($LiSbCl_6$), lithium hexachlorostannate ($Li_2SnCl_6$), lithium hexachlorozirconate ($Li_2ZrCl_6$), lithium hexachlorotitanate ($Li_2TiCl_6$) and lithium chlorosulfate ($LiClSO_3$), lithium perchlorodecaborane ($Li_2B_{10}Cl_{10}$) and lithium verchlorododecaborane ($Li_2B_{12}Cl_{12}$).

Other useful solute compounds are Lewis acids, particularly aluminum chloride ($AlCl_3$), boron trichloride ($BCl_3$), boron fluoride ($BF_3$), tin chloride ($SnCl_4$), antimony chloride ($SbCl_5$), antimony fluoride ($SbF_5$), titanium chloride ($TiCl_4$), aluminum bromide ($AlBr_3$), phosphorous fluoride ($PF_5$), phosphorous chloride ($PCl_5$), arsenic fluoride ($AsF_5$), arsenic chloride ($AsCl_5$), zinc chloride ($ZnCl_2$) and zirconium chloride ($ZrCl_4$), in conjunction with a metal halide such as lithium chloride. In addition, Lewis bases having the general formula $A_mB_n$ where A is an element selected from the group consisting of lithium, sodium, potassium, rubidium, cesium, magnesium, calcium, strontium, barium and the rare earths and B is an element selected from fluorine, chlorine, bromine, iodine and oxygen are also useful. Included in this latter category are cesium chloride, rubidium chloride and barium chloride.

The required anion and cation may be formed as a result of a chemical reaction directly with the solvent. For example, the Lewis acid $AlCl_3$ will react with the solvent $POCl_3$ to yield the anion $AlCl_4^-$. The anion and cation may also be formed as a result of the reaction of a Lewis acid with a Lewis base dissolved in the solvent. For example, lithium chloride (LiCl) a Lewis base, will react with $AlCl_3$ to form $LiAlCl_4$, which dissociates in part as solvated $Li^+$ and $AlCl_4^-$.

As already indicated, the EOL component is associated with the electrolytic solution. This component has an electropotential lower than that of the active primary cathode material and is selected from the group consisting of the Main Group V halides, preferably arsenic tribromide ($AsBr_3$), arsenic trichloride ($AsCl_3$), arsenic trifluoride ($AsF_3$) vanadium halides, transition metal sulfides and oxides except of those of the actinide series and technetium, silver chromate $Ag_2CrO_4$, and mixtures thereof. Other Group V halides are, for example, phosphorus tribromide ($PBr_3$) phosphorus pentabromide ($PBr_5$) and antimony tribromide ($SbBr_3$).

The transition metal compounds of the invention include, for example: tantalam disulfide ($TaS_2$), vanadium tribromide ($VBr_3$), manganese dioxide ($MnO_2$), titanium disulfide ($TiS_2$), cupric sulfide (CuS), vanadium pentoxide ($V_2O_5$), tantalum pentabromide ($TaBr_5$), lanthanum trifluoride ($LaF_3$).

The most preferred EOL components are: arsenic trichloride ($AsCl_3$), arsenic tribromide ($AsBr_3$), arsenic trifluoride ($AsF_3$), vanadium tribromide ($VBr_3$), vanadium pentoxide ($V_2O_5$), titanium disulfide ($TiS_2$), tantalum disulfide ($TaS_2$) and manganese dioxide ($MnO_2$).

These components function in effect as a secondary cathode relative to the active primary cathode in the electrolytic solution. The ratio of the EOL component to the primary cathode component determines where the end-of-life signal will occur during cell discharge. Preferably, the ratio of EOL component to the primary cathode component will be small in terms of the EOL component to provide a small discharge step following the substantial discharge of the primary cathode component of the electrolytic solution. Generally, less than about 25% of the total theorectical capacity of the cell should be comprised of the additive. The important consideration is that an adequate amount of additive be included to provide a suitable discharge variation for the particular cell design.

In the case of the arsenic halides, which are miscible or very soluble in the solvent cathode component, these EOL components may be incorporated directly into the electrolytic solution in a desired amount to provide end-of-life indication. In the case of a soluble transition metal EOL component compound eg., $VBr_3$ it may be dissolved in the solvent in various amounts as desired. Others such as $MnO_2$ which are sparingly soluble may be included so as to provide saturated solutions with excess solid present.

In the latter situation, the excess solid is preferably included in the form of a pressed pellet of the EOL component attached to the cathode current collector with a Teflon binder, for example, or integrally incorporated therein. For example, a carbon collector made from a lightly pressed mixture of carbon particles, $TaS_2$ particles and Teflon binder to form a 70% porous element is a most preferred form of this aspect of the invention.

To assemble a cell of the invention, it is merely necessary to couple the anode and cathode collector with the electrolytic solution therebetween and in contact therewith. Preferably, a separator of fritted glass, glass mat, polypropylene or polyethylene are used to separate the anode and the cathode current collector to prevent shorting therebetween. A porous cathode collector carrying electrolytic solution in the pores is preferred. The anode and cathode current collector may then be electrically contacted with appropriate electrode contacts and electrical lead wires. For example, stainless steel or nickel contacts may be used to contact the anode and cathode current collector.

If a porous separator, as referred to above, is used in the cell construction, the anode and cathode may be positioned on opposite sides of the porous separator with the electrolytic solution permeating the separator and extending between the anode and cathode current collector to form a couple therewith.

Assembly of the cells of the invention should take place in a dry room or a dry box at a relative humidity of less than 1%. Preferably, the cells will be sealed in a suitable container such as a stainless steel one which has been sealed by welding.

Generally speaking, all of the above described electrochemical cells operate similarly to the known prior art thionyl chloride cells in that the liquid phase transports the anode metal ion, such as the lithium ion, to the cathode current collector. However, in the case of this invention, the primary cathode component which is preferentially discharged i.e., chemically reduced, is the liquid oxyhalide or thiohalide component followed by the stepped discharge of the EOL component.

DESCRIPTION OF SPECIFIC EMBODIMENTS

The following Examples are given to enable those skilled in the art to more clearly understand and practice the present invention. The Examples should not be considered as a limitation of the scope of the invention but are described as being illustrative and representative thereof.

The cell Examples described include the preferred lithium anode, thionyl chloride-lithium tetrachloroalumminate electrolytic solution and porous carbon cathode collector, all of which are preferred components for use with the EOL components of the invention. Of the arsenic halide EOL components, arsenic trichloride ($AsCl_3$) is the most preferred component as is discussed further hereinbelow. Of the transition metal components $TaS_2$ is the preferred component as is also discussed further hereinbelow.

Table I describes the physical properties of the solutions used in preparing the cell Examples reported herein which include the EOL component. Table II displays the immediate electrical parameters for the cell Examples. The load voltages were recorded after 5 seconds or upon a stable reading. Table III displays the capacity and energy densities of the cell Examples. All of the data is compared to a reference cell similar in all rspects to the cells of the Examples but not including an arsenic halide EOL component.

TABLE I

| | Physical Properties | | |
|---|---|---|---|
| Description | Theo Ahr/g | Density (g/ml) | Conductivity $(cm)^{-1}$ |
| *LAC/THIC (reference cell) | .387 | 1.698 | $1.03 \times 10^{-2}$ |
| $AsCl_3$ EOL + LAC/THIC | .390 | 1.758 | $1.51 \times 10^{-2}$ |
| $AsBr_3$ EOL + LAC/THIC | .366 | 1.846 | $1.09 \times 10^{-2}$ |
| $AsF_3$ EOL + LAC/THIC | .389 | 1.730 | $1.46 \times 10^{-2}$ |
| LAC/THIC in solid transition metal compound system | .393 | 1.689 | $1.85 \times 10^{-2}$ |

*LAC = Lithium tetrachloroaluminate ($LiAlCl_4$)
THIC = thionyl chloride ($SOCl_2$)
EOL = end-of-life component

TABLE II

| | ELECTRICAL PARAMETERS | | | | |
|---|---|---|---|---|---|
| | MEDIAN OCV | MEDIAN LOAD VOLTAGE | | | MEDIAN RESISTANCE |
| Description | (volts) | 100K (volts) | 10K (volts) | 1K (volts) | (1kHZ) |
| LAC/THIC (reference cell) | 3.66 | 3.66 | 3.65 | 3.60 | 39.7 |
| $AsCl_3$ | 3.64 | 3.64 | 3.62 | 3.47 | 36.9 |
| $AsBr_3$ | 3.64 | 3.64 | 3.59 | 3.37 | 44.3 |
| $AsF_3$ | 3.66 | 3.66 | 3.60 | 3.19 | 78.0 |
| $VBr_3$ | 3.76 | 3.76 | 3.75 | 3.68 | 57.0 |
| $V_2O_5$ | 3.75 | 3.75 | 3.75 | 3.72 | 93.0 |
| $TiS_2$ | 3.60 | 3.60 | 3.60 | 3.59 | 112 |
| $TaS_2$ | 3.69 | 3.69 | 3.69 | 3.60 | 17.1 |
| $MnO_2$ | 3.97 | 3.97 | 3.97 | 3.95 | 13.0 |

TABLE III

| CAPACITIES AND ENERGY DENSITIES | | | | | |
|---|---|---|---|---|---|
| TABLE IIIA | | | | | |
| 2K Discharge | | | | | |
| Avg. Cell Wh/cell | Ah/g Catholyte Wh/ml can | Ah/ml Catholyte | Ah/cell | Wh/cell | Wh/ml |
| LAC/THIC (reference cell) | 313 (8) | 530 (14) | 769 (19) | 2.480 (.139) | .952 (.055) |
| $AsCl_3$ | 306 (7) | 537 (13) | 770 (22) | 2.492 (.158) | .989 (.063) |
| $AsBr_3$ | 250 (22) | 463 (41) | 653 (52) | 2.243 (.166) | .890 (.063) |
| $AsF_3$ | 346 (13) | 598 (23) | 803 (37) | 2.626 (.097) | 1.042 (.038) |
| $VBr_3$ | 346 (23) | 585 (39) | 589 (40) | 1.213 (.158) | .481 (.063) |
| $V_2O_5$ | 270 (8) | 455 (14) | 554 (19) | 1.623 (.158) | .644 (.063) |
| $TiS_2$ | 280 (8) | 473 (14) | 620 (8) | 1.642 (.100) | .652 (.040) |
| $TaS_2$ | 373 (8) | 630 (14) | 833 (23) | 2.622 (.103) | 1.040 (.041) |
| $MnO_2$ | 371 (20) | 626 (33) | 822 (38) | 2.642 (.198) | 1.048 (.079) |
| Best Cell | Max Ah/g | Max Ah/ml | Max Ah/cell | Wh max cell | Max Wh/ml |
| LAC/THIC (reference | 323 | 547 | 786 | 2.647 | 1.050 |

TABLE III-continued
CAPACITIES AND ENERGY DENSITIES
TABLE IIIA
2K Discharge

| cell) | | | | | |
|---|---|---|---|---|---|
| $AsCl_3$ | 318 | 560 | 808 | 2.706 | 1.074 |
| $AsBr_3$ | 272 | 502 | 706 | 2.465 | 0.978 |
| $AsF_3$ | 357 | 617 | 837 | 2.749 | 1.087 |
| $VBr_3$ | 368 | 621 | 631 | 1.422 | 0.564 |
| $V_2O_5$ | 277 | 469 | 573 | 1.725 | 0.685 |
| $TiS_2$ | 287 | 484 | 639 | 1.732 | 0.687 |
| $TaS_2$ | 385 | 651 | 866 | 2.730 | 1.083 |
| $MnO_2$ | 396 | 669 | 864 | 2.791 | 1.108 |

TABLE IIIB
2K and 22K Continuation Discharge

| Avg. Cell | Ah/g # Cathode | Ah/ml # Cathode | Ah/cell | Wh/cell | Wh/ml |
|---|---|---|---|---|---|
| LAC/THIC (reference cell) | 316 (14) | 533 (23) | 756 (19) | 2.582 (114) | 1.025 (45) |
| $AsCl_3$ | 305 (11) | 536 (20) | 767 (24) | 2.502 (77) | .993 (31) |
| $AsBr_3$ | 244 (17) | 451 (32) | 650 (40) | 2.255 (138) | .895 (55) |
| $AsF_3$ | 334 (19) | 577 (32) | 792 (14) | 2.744 (14) | 1.089 (6) |
| $VBr_3$ | 352 (5) | 593 (10) | 607 (8) | 1.528 (26) | .606 (10) |
| $V_2O_5$ | 275 (29) | 464 (49) | 567 (58) | 1.711 (207) | .679 (82) |
| $TiS_2$ | 277 (11) | 467 (20) | 589 (41) | 1.656 (197) | .657 (78) |
| $TaS_2$ | 363 (11) | 613 (19) | 809 (19) | 2.720 (50) | 1.079 (20) |
| $MnO_2$ | 359 (15) | 606 (26) | 782 (30) | 2.684 (80) | 1.065 (32) |
| Best Cell | Highest Ah/g | Highest Ah/ml | Highest Del. Q | Highest Wh/cell | Highest Wh/ml |
| LAC/THIC (reference cell) | 333 | 562 | 781 | 2.669 | 1.059 |
| $AsCl_3$ | 317 | 557 | 787 | 2.607 | 1.035 |
| $AsBr_3$ | 263 | 485 | 681 | 2.359 | 0.936 |
| $AsF_3$ | 352 | 609 | 804 | 2.760 | 1.095 |
| $VBr_3$ | 358 | 605 | 614 | 1.547 | 0.614 |
| $V_2O_5$ | 307 | 519 | 634 | 1.934 | 0.767 |
| $TiS_2$ | 278 | 598 | 617 | 1.741 | 0.691 |
| $TaS_2$ | 381 | 644 | 835 | 2.766 | 1.098 |
| $MnO_2$ | 372 | 628 | 816 | 2.798 | 1.110 |

The cell Examples described herein were constructed with an anode area of ca 7.5 cm². The anode was formed as a cylinder pressed to the inside surface of a stainless steel can (10 mm o.d.×35 mm height). A glass fiber filter separated the porous (85%) carbon current collector from the anode. This arrangement provided a high surface area carbon current collector. Shwanigan Black carbon is suitable for this purpose.

The cell was closed by inserting a cover equipped with a fill-tube (ca 16 gauge) that is isolated by means of a ceramic/glass insulator. The cover is then welded to the can providing a hermetic seal.

The electrolytic solutions are added into the cell using a vacuum fill technique. Electrical contact is made to the porous carbon current collector by inserting a nickel or stainless steel pin into the fill-tube piercing the carbon element. This wire acts also to provide a final hermetic closure after welding the wire to the fill-tube.

$AsCl_3$ EOL Component

Ten cells were assembled containing 2.52 g of LAC/THIC+$AsCl_3$ electrolytic solution. Each cell was constructed with nominally 0.270 g lithium and a 0.250 g porous carbon element. The LAC/THIC/$AsCl_3$ electrolytic solution contained 701 mAh of $SOCl_2$ (71.3%) and 282 mAh of the $AsCl_3$ additive (28.7%) with a total capacity of 983 mAh. These values assume two Faradays per mole of thionyl chloride and three Faradays per mole of arsenic trichloride.

The median AC impedance observed in these cells was 36.9 nearly that of the control LAC/THIC cells (39.7). Open circuit voltages for these cells were 3.64 volts while under a five second 1 K$\Omega$ resistive load, the LCV was 3.47 volts. This polarization was slightly higher than seen for reference cells (i.e., without the EOL component).

Under the 2 K$\Omega$ resistive load 770 mAh (2.492 Wh) were delivered on the average. This is similar to the energy and capacity delivered by the reference cells (769 Ah, 2.480 Wh). This represents 78% utilization of all available electrochemical capacity in the cells or 110% of the thionyl chloride capacity in the cells. The delivered capacity and energy observed under a 22 K$\Omega$ continuation test was 770 mAh and 2.502 Wh on the average.

$AsBr_3$ EOL Component

Ten cells were assembled in hardware identical to that used for the arsenic trichloride cells. These were filled with a solution of $AsBr_3$ (316 mAh) in $SOCl_2$ (636 mAh). The cells delivered 663 mAh (2.255 Wh) under 22 K$\Omega$ continuation testing and 674 mAh (2.243 Wh) under 2 K$\Omega$ discharge. This represents about 69% utilization of total electrochemical energy (2 Faraday per mole $SOCl_2$, 3 Faraday/mole $AsBr_3$) with the EOL inflection occurring near 90% of the delivered capacity under 2 KΩ rate and 95% at the 22 KΩ rate.

AsF₃ EOL Component

Ten of these cells were assembled in hardware identical to that used in the previous Examples. These cells delivered high capacity (793 mAh or 2.744 Wh 22 KΩ, 802 mAh or 2.626 Wh, 22 KΩ) and high energy density. Cells were prepared much as described above for the other arsenic halide EOL cells containing about 124 mAh of AsF₃ and 802 mAh of SOCl₂. The delivered capacity was 89% of the stoichiometric capacity under 2 KΩ discharge while 86% of the capacity was delivered under 22 KΩ continuation testing.

The arsenic trifluoride EOL cells appear to discharge to completion yielding three Faradays per mole of arsenic trifluoride. For the other arsenic halides the reduction process stops at one Faraday per mole of arsenic halide, probably due to consumption of the thionyl chloride and a sudden corresponding drop in the conductivity of the solution. Although the EOL additive is not fully utilized the thionyl chloride delivers increased capacity when arsenic halides are added as EOL indicators.

TaS₂ EOL Component

Ten batteries containing a solid pellet of TaS₂ were assembled in hardware identical to that described above. A TaS₂ pellet was attached to the carbon collector electrode with Teflon binder. Each cell nominally contained 264 mAh of TaS₂ and 2.23 g of thionyl chloride with 0.270 g lithium and a 0.250 g porous carbon element. The average stoichiometric capacity then is 1.13 Ah. This value assumes two Faradays per mole of thionyl chloride and four Faradays per mole of tantalum sulfide. The median AC impedance for these ten cells was 17.1Ω roughly half the median impedance of the reference control group. The open circuit voltage was slightly higher than in the control cells (3.69 V vs. 3.66 V) and the cells exhibited little polarization, indeed only 0.09 V voltage drop was observed under a five second 1 KΩ load.

Under a 2 KΩ resistive load the cells delivered an average of 845 mAh or 2.622 Wh per cell. This represents 74% utilization of all available electrochemical energy in the cell or 97% utilization of the thionyl chloride capacity. In the 22 KΩ continuation test 797 mAh or 2.720 Wh per cell was delivered. This represents 71% utilization of all the available capacity or 92% utilization of the thionyl chloride capacity. The end-of-life plateau occurred at 71% of the delivered capacity under 2 KΩ discharge and at 92% of the 22 KΩ continuation test.

The character of the EOL plateau in the discharge curves for the TaS₂ EOL system under a 2 KΩ load was less well defined than when observed under the 22 KΩ continuation test. In general under 2 KΩ load a smooth decline with an inflection at about 3.3 V was observed, yet when discharged to about 571 mAhr at 2 KΩ and relaxed to 22 KΩ a definite voltage step was observed at 92.5% of the delivered capacity occurring at 3.2 volts.

V₂O₅, VBr₃, TiS₂, MnO₂ EOL Components

These cells were assembled similarly to those described for the TaS₂ EOL systems with the EOL additive present as a dense pellet placed against the cathode collector at the bottom of the can. The cells were later vacuum filled with 1.4M thionyl chloride electrolyte. Generally, the cell total capacities were 1.10 Ahr (+0.040) with the EOL portion accounting for approximately 25% of the total capacity. The single exception was for the VBr₃ EOL system where the total theoretical capacity was 758 mAh with about 13% EOL capacity.

For the VBr₃ additive the voltage plateau began at about 100 mAh falling to 2.0 volts under 2 KΩ discharge until the cell expired rapidly. The same behavior was noted under the 22 KΩ continuation test yet when the load was relaxed the cells recovered to 3.4 V and exhibited a consistent EOL plateau at 2.7 volts which represented 13.6% of the total delivered capacity. Nearly 80% of the theoretical capacity was delivered under each test (557 mAh for 2 KΩ, 593 mAh for 22 KΩ continuation) while the energy delivered varied 26% (1.213 Wh at 2 KΩ, 1.528 Wh at 22 KΩ).

The voltage fell to a 3.0–3.1 V plateau with 200 mAh delivered in the V₂O₅ EOL system (except one anomolous cell) during the 2 KΩ and 22 KΩ continuation tests. Under the continuation test two cells showed EOL signals at about 2.7 V after relaxation (the others were depleted or nearly depleted under the 2 KΩ discharge). The EOL signals occurred at 13.6% discharge under 2 KΩ and 84% discharge when relaxed to 22 KΩ. The EOL signal at 22 KΩ fell from the 3.0 V plateau observed under the 2 KΩ discharge. Fifty-three percent of the total available energy was used in each test.

The discharge curve of the TiS₂ EOL system generally exhibited a weak EOL signal. This is thought to arise from the voltage drop under rapid discharge conditions. The EOL signal appeared as a ramp under 2 KΩ (about 80 mAh/V) and where applicable as a voltage step near 2.7 V under the 22 KΩ continuation test. It is not clear whether the 2.0 volt plateau seen under 22 KΩ testing occurs from polarization or whether the cell was near depletion having entered the EOL voltage plateau region prior to relaxation to 22 KΩ. Approximately 57% of the total capacity was delivered in each test (about 575 mAh or 1.65 Wh) with the EOL signals occurring nominally at 60% and 90% of the delivered capacity.

For the MnO₂ EOL system a voltage plateau was observed at 3.3 V at 80% of delivered capacity (2 KΩ) and 90% of delivered capacity under 22 KΩ continuation test. Two cells behaved anomolously under 2 KΩ discharge. The delivered capacity under 2 KΩ discharge was 840 mAh with delivered energy of 2.642 Wh while under 22 KΩ tests the capacity and energy delivered were 793 mAh and 2.684 Wh. These figures represent 73.2% and 69.7% of the available capacity or 96% and 91% of the thionyl chloride capacity.

The above described data for the various EOL components is tabularized in Table IV.

TABLE IV

Delivered Stoichiometric and Delivered Capacities for Lithium Thionyl Chloride Cells with EOL Components

| | | STOICHIOMETRIC | | 2K Delivered | | % | | STOICHIOMETRIC | | 2K + 22K Delivered | | % | |
|---|---|---|---|---|---|---|---|---|---|---|---|---|---|
| AsCl₃ | THIC Q | 701 | (3) | 633 | (46) | 90.3 | (6.3) | 696 | (11) | 682 | (18) | 101.0 | (5.0) |
| | EOL Q | 282 | (1) | 137 | (29) | 48.5 | (10.4) | 280 | (4.7) | 108 | (71) | 38.3 | (24.9) |

TABLE IV-continued

Delivered Stoichiometric and Delivered Capacities for Lithium Thionyl Chloride Cells with EOL Components

| | | STOICHIOMETRIC | | 2K Delivered | | % | | STOICHIOMETRIC | | 2K + 22K Delivered | | % | |
|---|---|---|---|---|---|---|---|---|---|---|---|---|---|
| | Total | 983 | (4) | 770 | (22) | 78.3 | (2.0) | 976 | (4.2) | 770 | (22) | 78.3 | (2.0) |
| | % T | 71.3 | — | 82.2 | (4.1) | | | 71.3 | — | 88.7 | (3.9) | | |
| | % E | 28.7 | — | 18.0 | (4.3) | | | 28.7 | — | 11.3 | (3.9) | | |
| $AsBr_3$ | THIC Q | 636 | (2) | 641 | (24) | 100.4 | (4.0) | 632 | (6) | 623 | (21) | 98.6 | (4.1) |
| | EOL Q | 316 | (1) | 33 | (11) | 10.4 | (3.7) | 314 | (3) | 44 | (9) | 14.0 | (3.0) |
| | Total | 952 | (7) | 674 | (52) | 68.5 | (5.9) | 946 | (12) | 663 | (40) | 68.5 | (5.0) |
| | % T | 66.8 | — | 96.1 | (2.5) | | | 66.8 | — | 93.4 | (1.4) | | |
| | % E | 33.2 | — | 3.9 | (2.5) | | | 33.2 | — | 6.6 | (1.4) | | |
| $AsF_3$ | THIC Q | 783 | (24) | 541 | (61) | 69.1 | (6.9) | 802 | (35) | 677 | (15) | 84.5 | (4.1) |
| | EOL Q | 120 | (3.6) | 261 | (52) | 218.0 | (45.0) | 124 | (6) | 116 | (29) | 94.4 | (24.0) |
| | Total | 903 | (26) | 802 | (37) | 88.9 | (3.4) | 926 | (35) | 793 | (14) | 85.8 | (4.8) |
| | % T | 87.7 | — | 67.4 | (6.3) | | | 87.7 | — | 85.4 | (3.4) | | |
| | % E | 13.3 | — | 32.7 | (6.3) | | | 13.3 | — | 14.6 | (3.4) | | |
| $VBr_3$ | THIC Q | 658 | (4) | 75.8 | (19) | 11.4 | (2.8) | 678 | (3) | 496 | (8) | 73.2 | (1.3) |
| | EOL Q | 100 | — | 482 | (75) | 48.2 | (75.0) | 100 | — | 110 | (7) | 110.0 | (6.9) |
| | Total | 758 | (5) | 557 | (40) | 77.7 | (5.3) | 778 | (3) | 606 | (8) | 78.0 | (1.2) |
| | % T | 86.8 | (.1) | 13.5 | (3.0) | | | 87.2 | (0) | 81.8 | (1.1) | | |
| | % E | 13.2 | (.1) | 86.5 | (3.1) | | | 12.8 | (0) | 18.2 | (1.1) | | |
| $V_2O_5$ | THIC Q | 796 | (10) | 285 | (7) | 35.7 | (1.0) | 811 | (5) | 261 | (39) | 32.1 | (4.8) |
| | EOL Q | 265 | — | 270 | (23) | 102.0 | (9.0) | 265 | — | 326 | (96) | 52.7 | (5.5) |
| | Total | 1061 | (10) | 555 | (19) | 52.2 | (1.7) | 1076 | (4) | 587 | (58) | 52.7 | (5.5) |
| | % T | 75.0 | (.2) | 51.4 | (2.6) | | | 75.3 | (.1) | 46.3 | (7.9) | | |
| | % E | 25.0 | (.2) | 48.6 | (2.6) | | | 24.7 | (.1) | 56.8 | (12.4) | | |
| $TiS_2$ | THIC Q | 861 | (12) | 370 | (46) | 42.9 | (5.2) | 838 | (49) | 335 | (36) | 42.1 | (4.5) |
| | EOL Q | 210 | — | 215 | (70) | 102.0 | (35.0) | 210 | (0) | 251 | (28) | 120.0 | (14.0) |
| | Total | 1071 | (12) | 585 | (64) | 55.1 | (6.0) | 1038 | (45) | 586 | (41) | 56.3 | (26.0) |
| | % T | 80.4 | (.2) | 64.2 | (10.0) | | | 79.9 | (1.0) | 56.7 | (4.2) | | |
| | % E | 19.6 | (.2) | 35.8 | (10.0) | | | 20.1 | (1.0) | 43.2 | (4.2) | | |

THIC Q = Thionyl chloride capacity (mAh)
Total = (mAh)
% E = % total capacity due to EOL component.
EOL Q = End-of-Life Component capacity (mAh)
% T = % total capacity due to thionyl chloride While the present invention has been described with reference to specific preferred embodiments thereof, it will be understood by those skilled in this art that various changes may be made without departing from the true spirit and scope of the invention. In addition, many modifications may be made to adapt the invention to a given situation without departing from its essential teachings.

Having described the invention, the exclusive property rights to which applicants are entitled are defined in the following claims.

We claim:

1. In an electrochemical cell including an oxidizable active anode material; a non-consumable, electrically conducting, inert cathode current collector material, an electrolytic solution bridging the anode and cathode current collector, the solution including a liquid, inorganic oxyhalide or thiohalide solvent and a solute for rendering the electrolytic solution conductive of anode metal ions, the improvement comprising the addition to the cell of a quantity of an EOL component, as an initial dischargeable constituent thereof, having an eletropotential lower than that of the solvent and being selected from the group consisting of arsenic trichloride, arsenic trifluoride, arsenic tribromide, the vanadium halides, the transition metal sulfides and oxides, except for the actinide series, and technetium, and mixtures thereof whereby EOL indication in the form of a step discharge is provided during discharge of the cell.

2. The electrochemical cell of claim 1 wherein the cathode current collector comprises a high surface area material.

3. The electrochemical cell of claim 1 wherein the cathode current collector material comprises carbon.

4. The electrochemical cell of claim 1 wherein the cathode current collector material comprises porous carbon.

5. The electrochemical cell of claim 1 wherein the cathode current collector material comprises high°surface area carbon.

6. The electrochemical cell of claim 5 including electrode separator means.

7. The electrochemical cell of claim 1 wherein the liquid oxyhalide solvent comprises thionyl chloride.

8. The electrochemical cell of claim 7 wherein the electrolytic solution solute comprises lithium tetrachloroaluminate.

9. The electrochemical cell of claim 8 wherein the anode material comprises lithium.

10. The electrochemical cell of claim 9 wherein the cathode current collector material comprises high surface area carbon.

11. The electrochemical cell of claim 1 wherein the liquid oxyhalide comprises phosphorous oxychloride.

12. The electrochemical cell of claim 1 wherein the solute comprises a soluble salt of the anode metal.

13. The electrochemical cell of claim 1 including porous separator means between the anode and cathode current collector.

14. The electrochemical cell of claim 1 wherein the anode is lithium, the cathode current collector is porous carbon, the liquid oxyhalide solvent is thionyl chloride and the solute is lithium tetrachloroaluminate.

15. The electrochemical cell of claim 14 including electrode separator means.

16. The electrochemical cell of claim 1 wherein the EOL component is selected from the group consisting of $VBr_3$, $V_2O_5$, $TiS_2$, $TaS_2$ and $MnO_2$.

17. The electrochemical cell of claim 1 wherein the EOL component is associated with the cell in the form of a solute in the electrolytic solution.

18. The electrochemical cell of claim 1 wherein the EOL component is associated with the cell in the form of a solid component contacting the cathode current collector.

19. The electrochemical cell of claim 18 wherein the EOL component is integrated into the cathode current collector.

20. The electrochemical cell of claim 1 including electrode separator means.

* * * * *

UNITED STATES PATENT AND TRADEMARK OFFICE
CERTIFICATE OF CORRECTION

PATENT NO. : 4,619,874

DATED : October 28, 1986

INVENTOR(S) : Paul M. Skarstad and Thomas G. Hayes

It is certified that error appears in the above-identified patent and that said Letters Patent are hereby corrected as shown below:

In the Abstract, line 15, before the word "oxides", insert the word --and--.

Signed and Sealed this

Twenty-seventh Day of January, 1987

Attest:

DONALD J. QUIGG

Attesting Officer       Commissioner of Patents and Trademarks